United States Patent [19]
Turner et al.

[11] Patent Number: 5,996,746
[45] Date of Patent: Dec. 7, 1999

[54] ADJUSTABLE TWIN TUBE SHOCK ABSORBER

[75] Inventors: Paul H. Turner, Boulder, Colo.; Michael L. McAndrews; Ronald Powers, both of Santa Cruz, Calif.

[73] Assignee: Rockshox, Inc., San Jose, Calif.

[21] Appl. No.: 09/046,300

[22] Filed: Mar. 23, 1998

Related U.S. Application Data

[60] Provisional application No. 60/051,648, Jul. 3, 1997.

[51] Int. Cl.$^6$ ........................................................ F16F 9/14
[52] U.S. Cl. ........................................... 188/269; 188/315
[58] Field of Search ............................... 267/64.11, 64.17, 267/221, 224, 225, 34; 188/269, 314, 315

[56] References Cited

U.S. PATENT DOCUMENTS

| | | | |
|---|---|---|---|
| 3,163,411 | 12/1964 | Heckethorn | 267/225 |
| 4,106,596 | 8/1978 | Hausmann | 188/269 |
| 4,372,545 | 2/1983 | Federspiel | 267/221 |
| 5,542,509 | 8/1996 | Bell | 188/315 |
| 5,618,248 | 4/1997 | Huang | 188/315 |
| 5,797,594 | 8/1998 | Sekine et al. | 188/315 |

FOREIGN PATENT DOCUMENTS

| | | | |
|---|---|---|---|
| 1202014 | 7/1959 | France | 188/269 |
| 556148 | 9/1993 | United Kingdom | 188/269 |

*Primary Examiner*—Matthew C. Graham
*Attorney, Agent, or Firm*—Skadden, Arps, Slate, Meagher & Flom; David W. Hansen

[57] ABSTRACT

A shock absorber formed of an inner tubular element telescopingly slidable within an outer tubular element. A piston is mounted on the inner tubular element and is provided with valving that permits adjustability of compression damping separate from rebound damping. Preferably, the piston slides within a glide tube substantially concentrically mounted within the outer tubular and having a highly finished surface along which the piston slides. A first chamber is formed within the glide tube a second chamber is formed between the outer tubular element and the glide tube. Valves are positioned between these first and second chambers to control compression flow and rebound flow separately and independently. A main compression spring is positioned external to and between the inner and outer tubular elements of the shock absorber, and acts to bias the tubular elements away from each other. A gas chamber positioned within the inner tubular element serves to assist the main compression spring in biasing the inner and outer tubular elements, and also acts as part of a volume compensation system when the shock absorber is compressed and expanded.

11 Claims, 6 Drawing Sheets

ADJUSTABLE TWIN TUBE SHOCK ABSORBER

CROSS-REFERENCE TO RELATED APPLICATION

The present application claims the benefit of the earlier filing date of pending U.S. Provisional Patent Application Ser. No. 60/051,648, entitled "Adjustable Twin Tube Shock Absorber," which was filed Jul. 3, 1997.

BACKGROUND OF THE INVENTION

The present invention relates to the design and construction of high performance shock absorbers. More particularly, the present invention relates to a light-weight, adjustable twin tube shock absorber comprising an air-assisted, coil sprung suspension system that is hydraulically damped. The suspension system of the present invention is particularly suited for use in connection with a bicycle suspension system such as a rear bicycle wheel suspension assembly.

In the past, suspension systems in general have been used for many applications, including cushioning impacts, vibrations or other disturbances experienced by vehicles and machinery. Typical vehicles benefitting from the use of suspension systems include bicycles and motor-cycles. For example, bicycles have been developed with suspension systems for cushioning impacts or vibrations incurred when the bicycle is ridden over bumps, ruts, rocks, pot holes, or other obstacles. Typically, bicycle suspension systems have been configured for use in the front or rear bicycle fork, in the head tube that connects the front fork to the bicycle frame and handlebars, in the seat post, and in conjunction with a rear wheel swing-arm assembly, as well as in other locations.

Shock absorbers are commonly used with suspension systems to damp undesirable oscillations of the suspension system caused by irregularities of the road surface. A commonly used shock absorber is a hydraulic type which uses a piston and cylinder arrangement. Damping fluid in the cylinder is forced by the piston (which moves with the functioning of the suspension system) through narrow holes or valves. The resistance encountered as the fluid passes through the holes or valves damps the oscillations of the suspension system.

There is an ongoing need for improvements in the art of shock absorbers. For example, there is a need in shock absorbers, particularly those used in bicycle suspension applications, for reductions in weight and manufacturing costs. There is also a need for a high degree of adjustability of the damping capabilities and characteristics of shock absorbers. In particular, there is a need for a shock absorber in which the main compression spring used for supporting a load applied to the suspension system has a broad range of adjustability for adapting to a wide variety of load conditions. In addition, it is desirable to have a shock absorber with a high degree of compression and rebound damping adjustment capability, and particularly for such a shock absorber in which the compression and rebound damping characteristics are separately adjustable. Finally, there is a need for improvements of the kind previously described which result in a more rigid shock design.

It is therefore an object of the present invention to provide a shock absorber that permits a high degree of main compression spring adjustability.

It is another object of the present invention to provide a shock absorber having a damping system permitting a high degree of damping adjustability.

It is yet another object and to provide a shock absorber in which the compression and rebound damping characteristics are separately adjustable.

It is another object to provide a rigid shock absorber having low weight and manufacturing costs.

SUMMARY OF THE INVENTION

The present invention is direct to a shock absorber for use in a suspension system. The shock absorber comprises an inner tubular element telescopingly engaged with an outer tubular element and a fluid-based damping system positioned therein for controlling damping fluid flow during compression and expansion or rebound of the suspension system.

The outer tubular member generally comprises an outer cylindrical body having a first end and a second end, and the inner tubular member generally comprises an inner cylindrical body having a first end and a second end, the inner cylindrical body being slidable within the outer cylindrical body. A main compression spring, which is preferably a coil spring, is positioned between and externally of the outer and inner cylindrical bodies for biasing the bodies away from one another so that the shock absorber will return to its expanded configuration after being compressed.

Preferably, a gas chamber is positioned internally of the outer and inner cylindrical bodies such that it is able to assist the main compression spring in biasing the outer cylindrical body and the inner cylindrical body away from one another in a neutral, spaced-apart configuration. More preferably still, the spring-assist gas chamber is further configured to act as a volume compensation system for the suspension system when the shock absorber compresses or expands.

The inner cylindrical body preferably has a piston assembly coupled to its first end. The piston assembly may comprise a piston having two sides and permitting damping fluid to flow from one side of the piston to the other side of the piston when the shock absorber is compressed or expanded.

The shock absorber preferably comprises separate compression and rebound damping circuits having respective compression and rebound damping valves which are separately adjustable. The adjustable compression and rebound damping valves may be low-speed damping valves, and the compression and rebound damping circuits may further comprise high-speed compression and rebound damping valves for operation in conjunction therewith.

A glide tube preferably is positioned within the outer cylindrical body, and the piston assembly slides within the glide tube. The glide tube preferably is substantially concentrically positioned within the outer cylindrical body, and has an inner surface with a fine finish. In addition, the glide tube may formed of stainless steel. A first chamber of the damping system is defined within the glide tube, and a second substantially annular chamber is defined between the outer cylindrical body and the glide tube. Preferably, the shock absorber has a mounting portion that couples the first ends of the outer cylindrical body and the glide tube.

The mounting portion may comprise a valve assembly positioned within the body of the mounting portion and providing regulated communication between the first and second chambers. The valve assembly preferably comprises a compression damping valve and a rebound damping valve, and externally accessible adjuster knobs for adjusting these valves. Thus, the valve assembly is capable of separately regulating the flow of compression and rebound damping fluid between the first and second chambers as the shock absorber is compressed and expanded (and as the piston assembly slides inward and outward with respect to the glide tube) such that compression damping and rebound damping of the suspension system are separately controllable. The compression damping valve and rebound damping valve may comprise respective one-way compression and rebound valves.

The shock absorber of the present invention preferably includes a third chamber defined between the piston assembly and the inner cylindrical body (and, where a glide tube is used, within the glide tube). The first chamber and third chamber are separated by all or a portion of the piston assembly, and a first valve assembly is preferably formed in the piston assembly to control the flow of fluid between the first chamber and the third chamber. Fluid flow control through the first valve assembly may be achieved using a valve washer selectively covering one or more ports extending through a first piston dividing the first and third chambers, such that only compressive fluid flow is permitted through the piston ports.

The piston assembly may further comprise a second piston mounted in tandem with the first piston on the inner cylindrical body, the first piston being adjacent the first chamber and the second piston being positioned between the first piston and the inner cylindrical body, and a fourth chamber may be defined axially between the first and second pistons. The first and second chambers may be in regulated communication with each other, and the third and fourth chambers may be in fluid communication with each other.

Although the first and second pistons may be formed integrally or in other obvious ways, the piston assembly may be coupled to the first end of a piston mount, the second end of the piston mount being coupled to the inner cylindrical body such that the piston mount couples the piston assembly to the inner cylindrical body. Preferably, the piston mount has a hollow interior and defines part of the third and fourth chambers, and the second valve is positioned on the first end of the piston mount.

The first valve assembly may further comprise a first valve controlling only compression damping fluid flow between the first and fourth chambers to thereby control compression fluid flow between the first and third chambers. In addition, the first valve assembly may comprise a second valve controlling only rebound damping fluid flow between the first and third chambers. This second valve may be a one-way valve comprising a blocking element seated against a first open end of the piston mount and a biasing element biasing the blocking element toward the first open end of the piston mount to selectively close the first open end.

A sixth chamber may be defined between the second piston, the inner cylindrical body, and the glide tube. When so formed, the second chamber may be in fluid communication with the sixth chamber. The first valve assembly may further comprise a third valve in the second piston, the third valve separately controlling compression and rebound damping fluid flow between the fourth chamber and the sixth chamber such that compression damping is adjustable independently from rebound damping.

A floating piston preferably is positioned within the inner cylindrical body, wherein a fifth chamber may be defined between the second end of the inner cylindrical body and the floating piston. The fifth chamber is preferably pressurized to counteract pressure exerted against the floating piston by damping fluid entering the fourth chamber when the suspension system compresses. A pressure valve may be provided in fluid communication with the second end of the inner cylindrical body to permit adjustment of the pressure within the fifth chamber.

The shock absorber of the present invention is intended for use with any machine, vehicle or other object requiring shock absorption. The principles of the present invention are particularly useful when applied to the shock absorber of a rear bicycle suspension system.

Still other objects and advantages of the present invention will become readily apparent to those skilled in this art from the following detailed description, wherein only the preferred embodiment of the invention is described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION OF THE INVENTION

Figure 1:
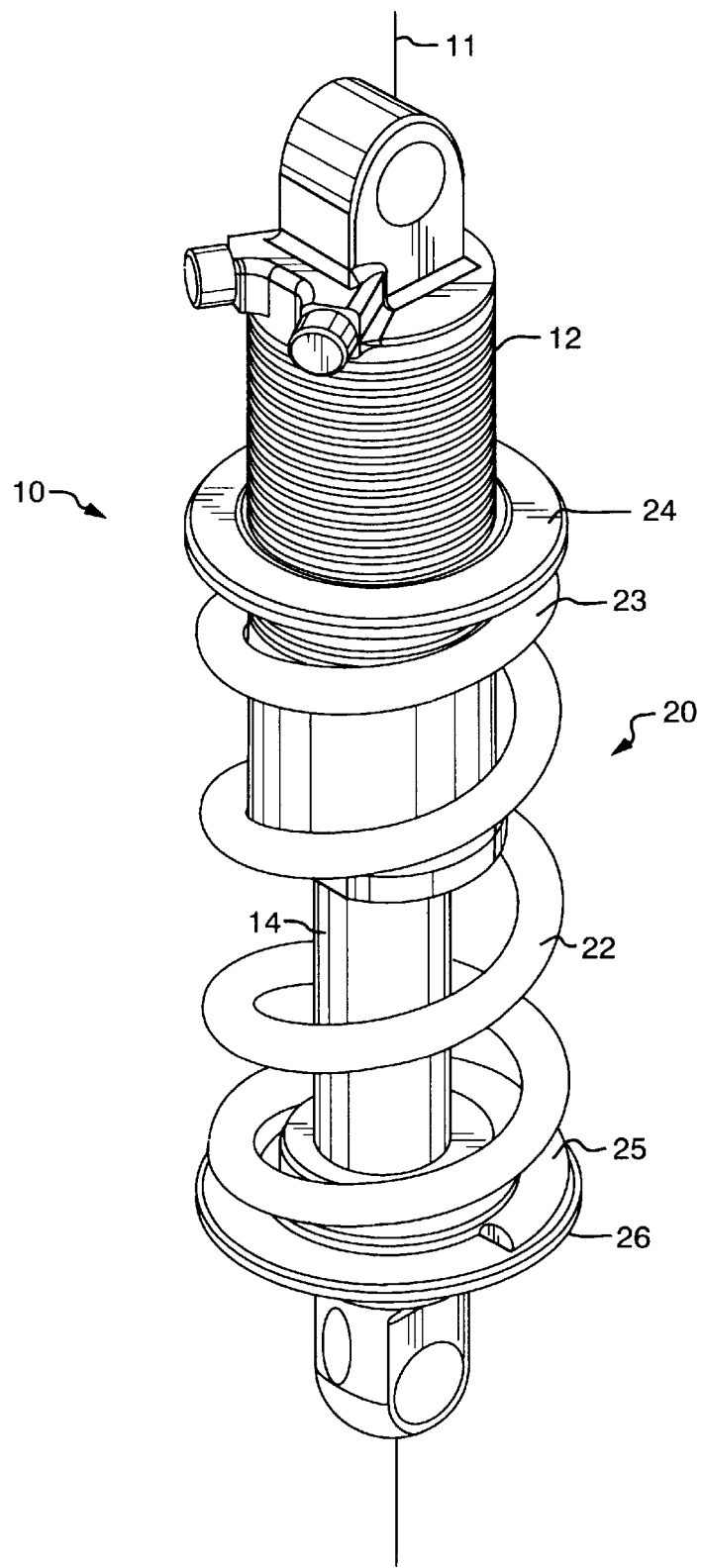
FIG. 1 is a perspective view of a shock absorber formed in accordance with the principles of the present invention.
Figure 2:
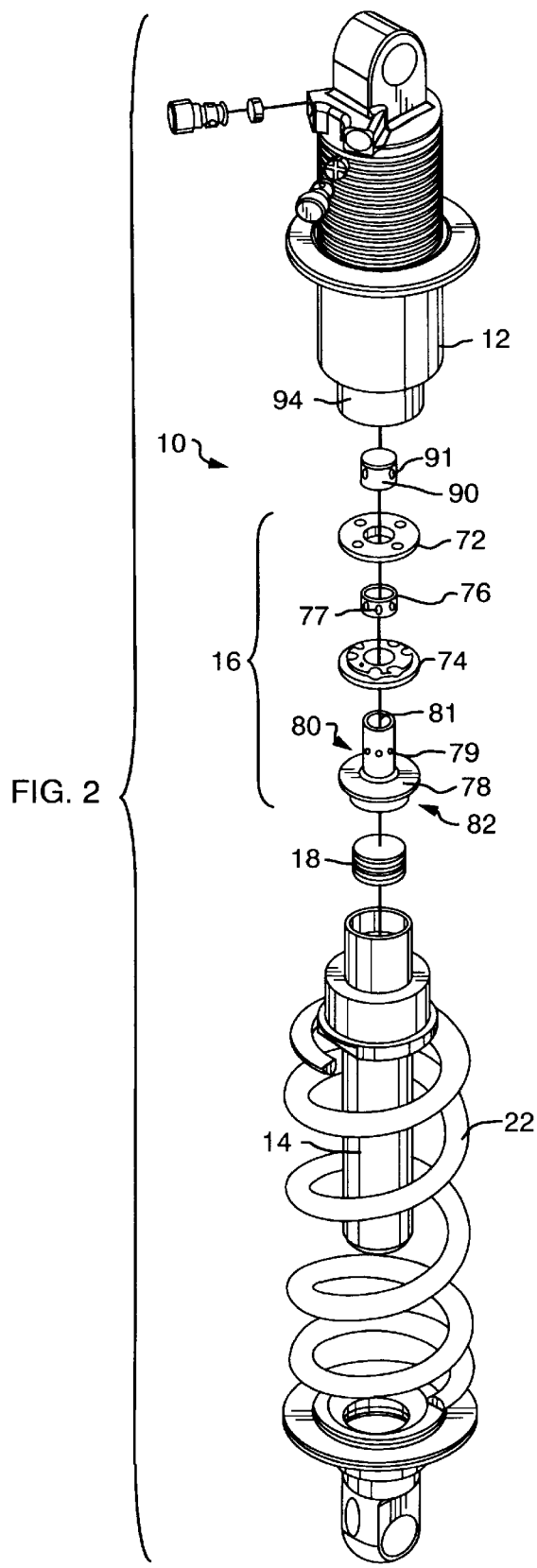
FIG. 2 is an exploded perspective view of the shock absorber of FIG. 1.

A preferred embodiment of a shock absorber 10 formed in accordance with the principles of the present invention for use in a suspension system such as a bicycle suspension system is shown in FIG. 1. Shock absorber 10 has an outer cylindrical body 12 and an inner cylindrical body 14. Outer cylindrical body 12 is hollow such that inner cylindrical body 14 may slide therein. Inner cylindrical body 14 is also hollow and contains a piston assembly 16 and floating piston 18, which may be seen in the exploded view of FIG. 2. Preferably, as illustrated in FIGS. 1 and 2, a main compression spring assembly 20, comprised of an outer coil spring 22, a spring seating ring 24, and a spring shoulder 26, is mounted about outer and inner cylindrical bodies 12, 14 to resist compression of outer and inner cylindrical bodies 12 and 14, and thereby to resist and to support loads applied to shock absorber 10. First end 23 of outer coil spring 22 is seated against spring seating ring 24. Preferably, spring seating ring 24 is threaded on a threaded outer surface of outer cylindrical body 12 so that the position of spring seating ring 24 may be adjusted along longitudinal axis 11 of shock absorber 10 in order to adjust the preload on outer coil spring 22. Shoulder 26 is typically fixed to a mounting portion but may also be adjustably positionable if desired.

Figure 3:
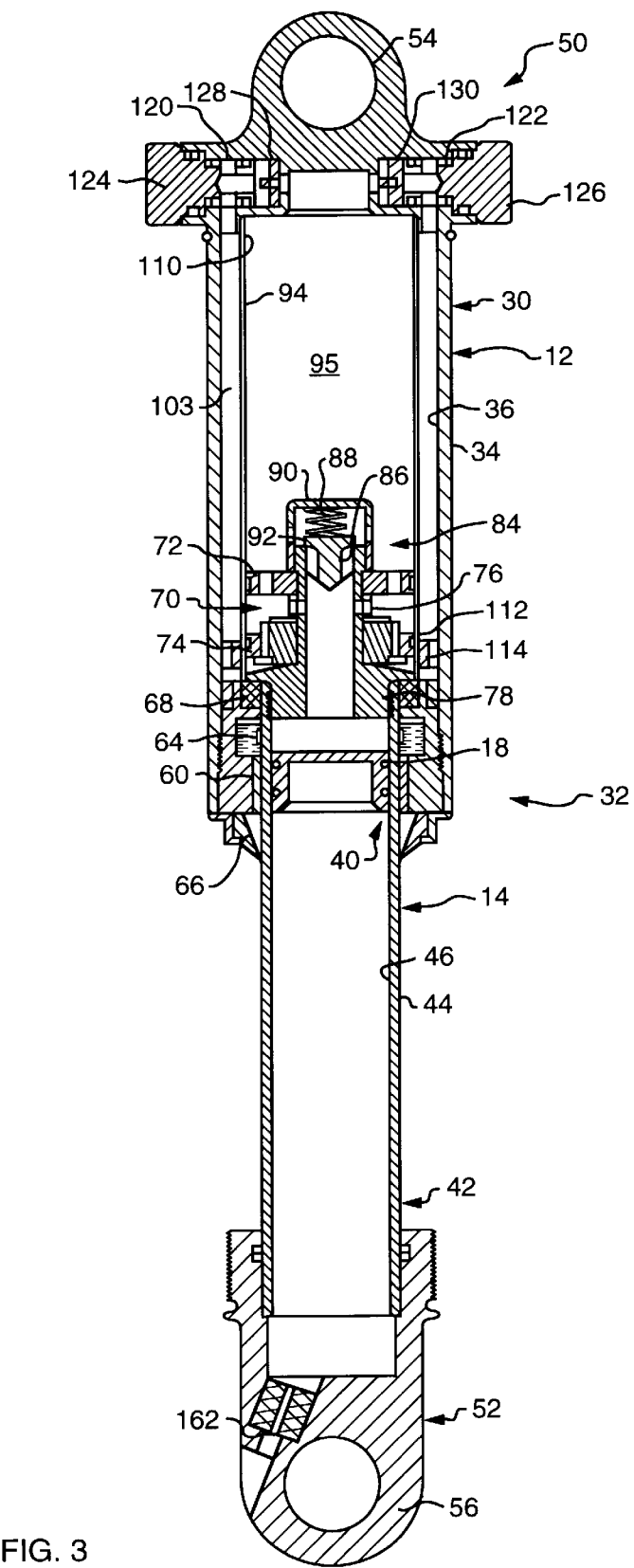
FIG. 3 is a cross-sectional view of the shock absorber of FIG. 1, without the spring assembly.

The cross-sectional view of FIG. 3 shows a preferred arrangement of elements of shock absorber 10 of the present invention. As may be seen, outer cylindrical body 12 has a first end 30, a second end 32, an outer surface 34, and an inner surface 36. Similarly, inner cylindrical body 14 has a first end 40, a second end 42, an outer surface 44, and an inner surface 46. The first end 40 of the inner cylindrical body 14 is telescopingly engaged within the second end 32 of outer cylindrical body 12. As shock absorber 10 compresses, inner cylindrical body 14 telescopes into outer cylindrical body 12 such that first end 40 of the former approaches first end 30 of the latter.

First end 30 of outer cylindrical body 12 and second end 42 of inner cylindrical body 14 are preferably respectively coupled to first and second mounting portions 50 and 52. First mounting portion 50 is provided with a mounting element 54, such as an eyelet, by which the outer cylindrical body 12 of shock absorber 10 may be coupled to the object to be supported (e.g., a bicycle frame). Second mounting portion 52 is similarly provided with a mounting element 56, such as an eyelet, by which the inner cylindrical body 14 may be secured to another supporting structural element (e.g., a bicycle wheel). Thus, movement of the supporting element relative to the object to be supported causes relative movement of cylindrical bodies 12 and 14. Movement of cylindrical bodies 12 and 14 together (such that inner cylindrical body 14 telescopingly slides into outer cylindrical body 12) is considered a "compression stroke" whereas the opposite motion is considered a "rebound stroke" or an "expansion stroke." Preferably, inner cylindrical body 14 slides in bushing 60. A fluid seal 64 is provided to prevent leakage of damping fluid from within cylindrical bodies 12, 14. Additionally, dust seal 66 preferably is provided to prevent dust from entering outer cylindrical body 12. A top out pad 68 may be provided to prevent overextension of cylindrical bodies 12, 14 during an expansion stroke.

Figure 4:
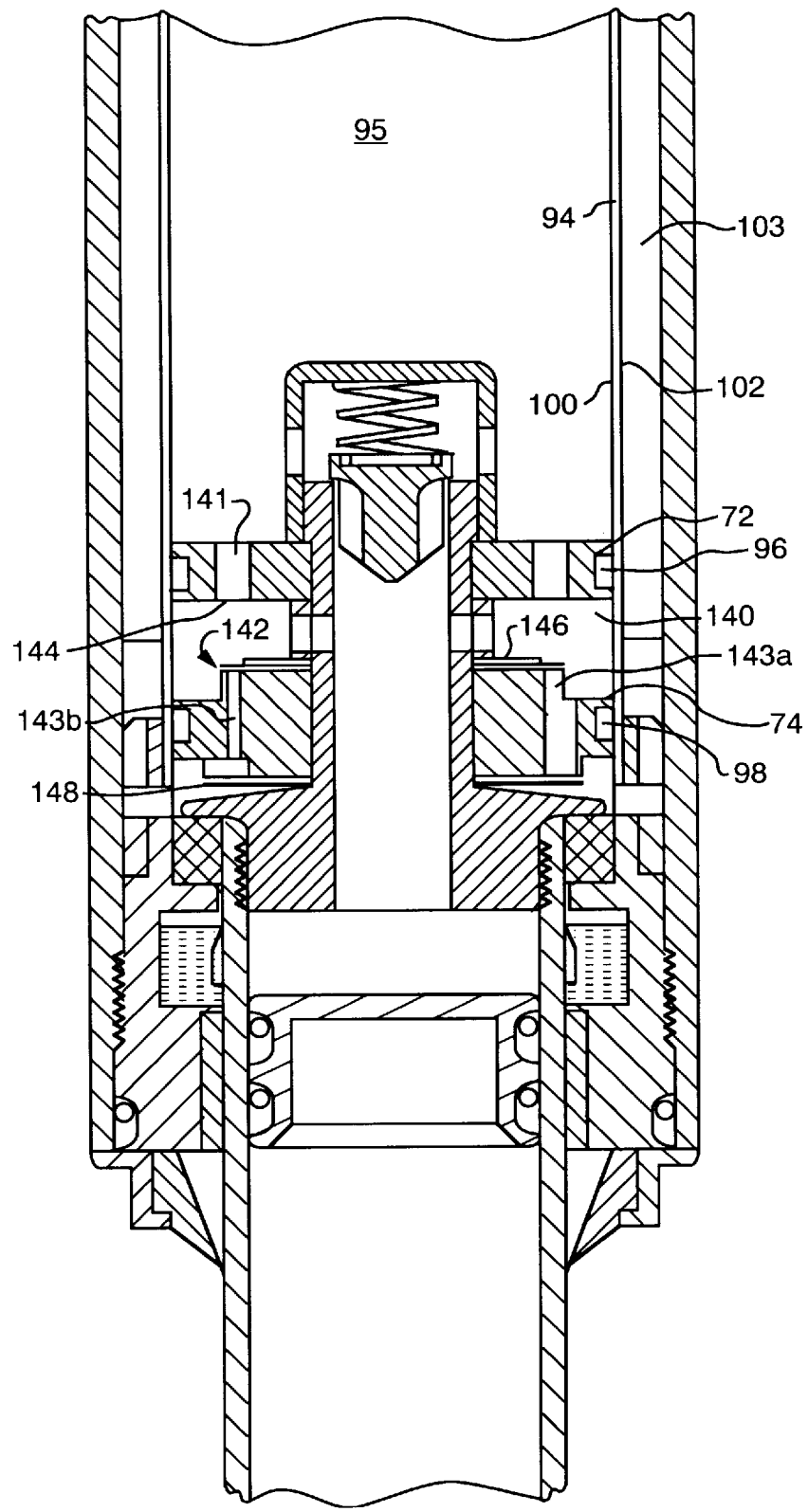
FIG. 4 is a cross-sectional view of the floating piston and high-speed damping assembly of the shock absorber of FIG. 3.
Figure 5:
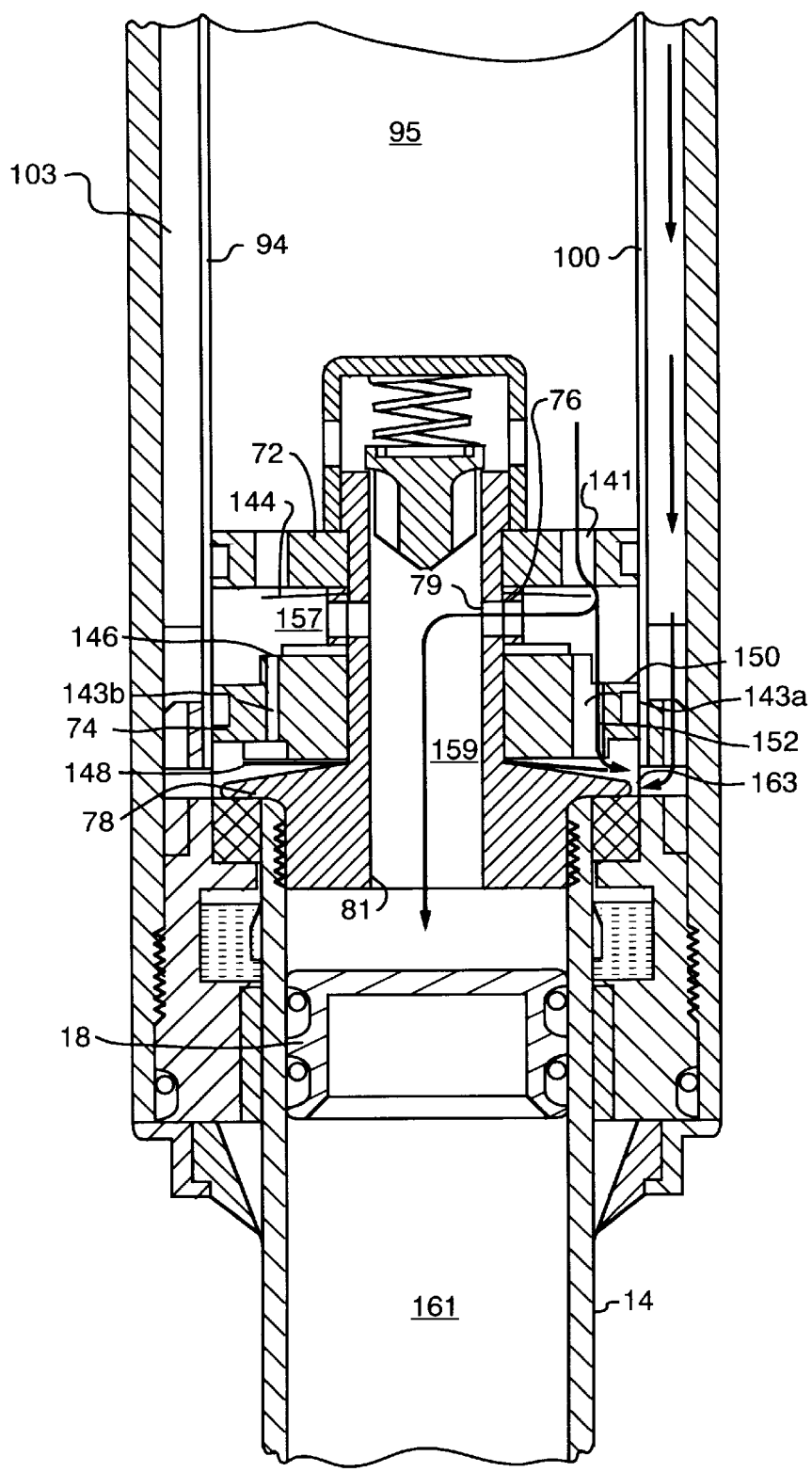
FIG. 5 is a cross-sectional view of the floating piston and high-speed damping assembly shown in FIG. 4, but also illustrating the flow path of the damping fluid during the compression stroke of the shock absorber.
Figure 6:
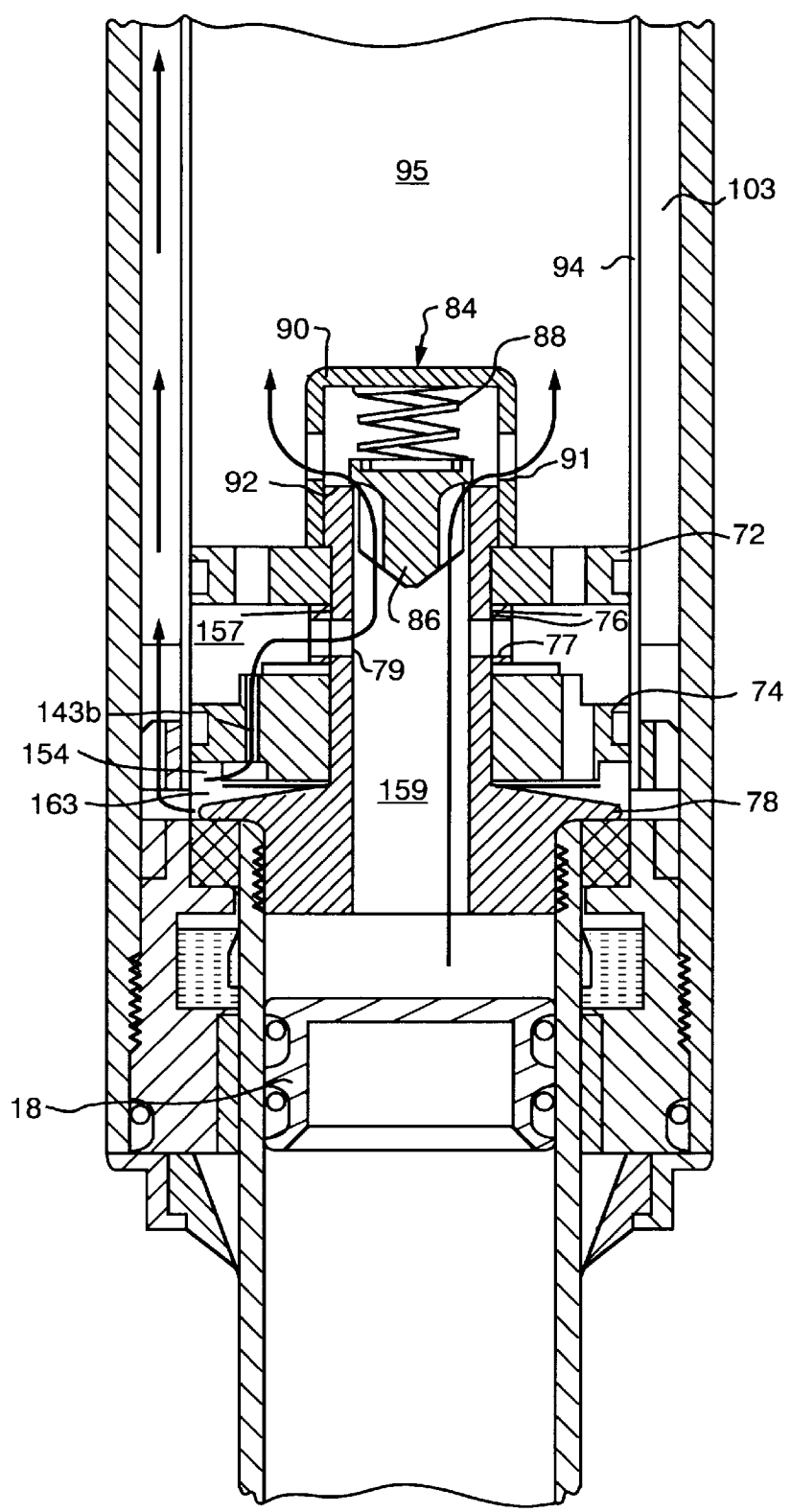
FIG. 6 is a cross-sectional view of the floating piston and high-speed damping assembly shown in FIG. 4, but also illustrating the flow path of the damping fluid during the rebound stroke of the shock absorber.

Generally, shock absorber 10 of the present invention has a piston assembly 16 secured to the first end 40 of inner cylindrical body 14. Although piston assembly 16 may comprise a single piston with valving therethrough (preferably having separate compression and rebound damping circuits), the piston assembly in the preferred embodiment of FIG. 3 includes a tandem piston assembly 70 having first and second pistons 72, 74 spaced apart by a piston spacer 76. valving is preferably provided in each piston 72, 74 as shown in FIGS. 4–6 and described in further detail below. Pistons 72, 74 and spacer 76 are mounted on piston mount 78, which may be formed integrally with inner cylindrical body 14 or as a separate piece coupled (such as, for example, by threading) to first end 40 of inner cylindrical body 14. Piston mount 78 is hollow and has a first open end 80 and a second open end 82 such that each end opens into the hollow interior of piston mount 78. Piston spacer 76 and a corresponding portion of piston mount 78 over which piston spacer 76 is mounted have at least one and preferably a plurality of corresponding lateral bores 77, 79 in fluid communication for purposes detailed below. A check valve assembly 84 is mounted on the first end 80 of piston mount 78. Check valve assembly 84 includes a flow blocking element 86, a biasing element 88 (such as a coil spring or other spring), and a biasing element seat or cap 90, with one or more lateral bores 91 therethrough. Blocking element 86 is biased against a valve seat 92 on piston mount 78 to close check valve assembly 84. The function of check valve assembly 84 is described in further detail below. The second end 82 of piston mount 78 is coupled to first end 40 of inner cylindrical body 14. A longitudinal bore 81 is formed through piston mount 78 extending between ends 80 and 82.

A hollow cylindrical piston glide tube 94 is concentrically positioned within outer cylindrical body 12. The interior of glide tube 94 forms a chamber 95 within which pistons 72, 74 slide. First and second pistons 72, 74 have respective piston seals or glide rings 96, 98 that form a seal against an inner surface 100 of glide tube 94. Pistons 72 and 74 thus easily glide along the inner surface 100 of glide tube 94. Glide tube 94 has an outer surface 102 facing and spaced apart from the inner surface of outer cylindrical body 12, thus forming an annular chamber 103 therebetween. The first end 110 of glide tube 94 is coupled to the first end 30 of the outer cylindrical body, preferably via a portion of first mounting portion 50. The second end 112 of slide tube 94 is mounted adjacent second end 32 of outer cylindrical body 12 (preferably above bushing 60), preferably via a mounting element 114.

Preferably, piston glide tube 94 is a thin tube formed from a lightweight, inexpensive material such as stainless steel and having a fine internal finish. Such a finish enhances the longevity and performance of the piston seals or glide rings 96, 98. Thus, the "twin tube" design of glide tube 94 within outer cylindrical body 12 eliminates the need for inner surface 36 of larger outer cylindrical body 12 to have a fine surface finish. Because the cost of adding a piston glide tube 94 is significantly less than that of providing a fine finish on inner surface 36 of outer cylindrical body 12, this twin tube design results in a significant savings in the manufacturing cost of shock absorber 10 of the present invention.

Additionally, the twin tube design provides a damping fluid flow path that may be configured to permit separate compression and rebound damping. Above-mentioned chambers 95 and 103 contain an incompressible damping fluid such as hydraulic oil, glycerine, fish oil, or water, or a combination thereof. In the preferred embodiment, a common grade of hydraulic oil is used. The damping fluid is forced through separate compression and rebound damping valves of shock absorber 10 during the compression and rebound strokes of shock absorber 10, respectively, to move between chambers 95 and 103 in order to damp the suspension system with which shock absorber 10 is used. Such damping will now be described with reference to FIGS. 3–6.

The first mounting portion 50 includes a compression damping valve 120 and a rebound damping valve 122.

These valves will be referred to herein as "low-speed" damping valves because, although they may provide both high-speed and low-speed damping, they are capable of substantially controlling the low-speed damping performance of the shock absorber, i.e., damping in response low-speed movements of inner cylindrical body 14 relative to outer cylindrical body 12. The low-speed compression and rebound damping valves 120, 122 are positioned relative to glide tube 94 and outer cylindrical body 12 to permit fluid to pass between first chamber 95 and second chamber 103. During a compression stroke, damping fluid thus passes from first chamber 95 to second chamber 103 through low-speed compression damping valve 120. During a rebound stroke, damping fluid thus passes from second chamber 103 to first chamber 95 through low-speed rebound damping valve 122.

Low-speed compression and rebound damping valves 120, 122 preferably are needle valves that are externally adjustable by the user via respective compression and rebound flow adjuster knobs 124, 126. Adjustment of flow adjuster knobs 124, 126 modifies the size of the flow ports through their respective valves, thereby controlling the compression or rebound flow and thus the damping characteristics of the valve. This adjustment may also be accomplished with a cam type arrangement or any other known valve configuration. Thus, the damping characteristics of the compression and rebound flows are separately, externally adjustable.

Low-speed compression and rebound damping valves 120 and 122 also include corresponding check valves 128, 130 so that low-speed compression damping valve 120 damps only compressive flows, and low-speed rebound damping valve 122 damps only rebound flows. The use of check valves 128, 130 thus enables the user to independently adjust the low-speed compression and rebound damping characteristics of shock absorber 10.

Referring now to FIGS. 4–6, first and second pistons 72, 74, coupled to inner cylindrical body 14, provide respective one-way flow paths between the interior of glide tube 94 and inner cylindrical body 14 (described in further detail below) for damping fluid during the compression and rebound strokes of shock absorber 10. Both first and second pistons 72, 74 include valves 140, 142 comprised of one or more flow ports 141, 143 engaged by a valve washer 144, 146, 148. The valves 140, 142 provided in first and second pistons 72, 74 will be referred to herein as "high-speed" damping valves because, although they may provide both high-speed and low-speed damping, they are capable of substantially controlling the high-speed damping performance of shock absorber 10, i.e., damping in response to high-speed movements of inner cylindrical body 14 relative to outer cylindrical body 16. The high-speed damping valves 140, 142 may be adjusted, for example, by adding or removing valve washers or by increasing the gauge of the valve washers.

High-speed damping valve 140 is formed to function as a one-way compression damping valve because of the position of washer 144 with respect to ports 141. As may be understood from FIGS. 4–6, rebound flow cannot pass washer 144 to enter ports 141. In contrast, high-speed damping valve 142 controls fluid flow therethrough during both rebound and compression strokes. As may be seen in FIGS. 4–6, at least one port 143 is formed as a compression port 143a having a fluid inlet 150 such that fluid flow is permitted therethrough during a compression stroke. Second washer 148 controls compression flow through the outlet 152 of compression port 143a. The rebound port or ports 143b however, are blocked by first washer 146 such that compression flow does not pass therethrough. Similarly, at least one port 143 is formed as a rebound port 143b having a fluid inlet 154 such that fluid flow is permitted therethrough during a rebound stroke. First washer 146 controls rebound flow through the outlet 156 of rebound port 143b. The compression port or ports 143a however, are blocked by second washer 148 such that rebound flow does not pass therethrough.

The damping functions performed within shock absorber 10 will now be described. As illustrated in FIG. 5, during the compression stroke of shock absorber 10, first end 40 of inner cylindrical body 14, and thus first and second pistons 72, 74 attached thereto, move toward first end 30 of outer cylindrical body 12. Damping fluid flows along a compressive flow path from first chamber 95 to second chamber 103 through low-speed compression damping valve 120, as described above. In addition, as shown in FIG. 5, compression flow passes through ports 141 in first piston 72 (as controlled by washer 144) and into a third chamber 157 defined between first and second pistons 72 and 74. Part of the compressive flow then passes into a fourth chamber 159 through one or more lateral bores 77 in spacer 76 and lateral bores 79 in piston mount 78. The fourth chamber 159 is defined by longitudinal bore 81 through piston mount 78, check valve assembly 84, and inner cylindrical body 14, extending to floating piston 18. The portion of compressive flow that passes into fourth chamber 159 acts against floating piston 18.

Floating piston 18 positioned within inner cylindrical body 14 separates the damping fluid in the fourth chamber 159, located on one side of floating piston 18, from a gas (preferably air, but which could be foam or any compressible gas) in a fifth chamber 161 located on the other side of floating piston 18 within inner cylindrical body 14. As the tandem piston assembly 16 moves toward the first end 30 of outer cylindrical body 12 during compression, the damping fluid displaced by piston assembly 16 pushes against floating piston 18. The gas acting on the other side of floating piston 18 is compressed, and its volume decreases, thereby compensating for the displacement of damping fluid caused by movement of tandem piston assembly 16 and inner cylindrical body 14. As can be seen in FIG. 3, a sealable port or valve 162 is preferably provided in second mounting portion 56 at second end 42 inner cylindrical body 14 through which the gas pressure within fifth chamber 161 may be adjusted.

Unlike traditional designs, the design of tandem piston assembly 16 is such that the damping fluid acting on the floating piston permits the use of abnormally low gas pressures in fifth chamber 161, e.g., at least as low as approximately 75 psi. This is significant in combination with the positioning of the floating piston and chamber 161, because the use of excess pressure in chamber 161 may be used as a spring-assist to outer coil spring 22. As a result, the spring rate of the overall spring system may be reduced, thus making possible a reduction in the size and weight of outer coil spring 22. In addition, the spring rate of the overall compression spring system may be varied by inserting gas into, or releasing gas from, chamber 161, and is highly adjustable in this manner.

A portion of the compression flow does not pass into fourth chamber 159 to act against floating piston 18 during the compression stroke of shock absorber 10, but instead passes through second piston 74 and into sixth chamber 163 defined by second piston 74, the inner surface 100 of glide tube 94, and outer surface 44 of inner cylindrical body 14 (which progressively slides into glide tube 94 during compression of shock absorber 10). As FIG. 5 illustrates, sixth chamber 163 is in fluid communication with second chamber 103 such that sixth chamber 163 also receives compression flow from second chamber 103 which has passed through low-speed compression valve 120.

During the rebound stroke of shock absorber 10, as shown in FIG. 6, first end 40 of inner cylindrical body 14 and first and second pistons 72, 74 attached thereto move away from first end 30 of outer cylindrical body 12. Damping fluid from sixth chamber 163 passes into first chamber 95 via second chamber 103 and low-speed rebound damping valve 122. Additionally, rebound damping fluid flows into first chamber 95 via the one-way rebound ports 143b of second piston 74, third chamber 157 between the first and second pistons 72, 74, fourth chamber 159, and check valve assembly 84 as follows. The fluid in third chamber 157 joins the fluid in fourth chamber 159 by passing through the one or more lateral bores 77, 79 through the wall of piston spacer 76 and piston mount 78, respectively. If the flow is sufficiently strong, check valve assembly 84 opens to permit flow from fourth chamber 159 into first chamber 95.

As may be appreciated from FIG. 6, and as mentioned above, check valve assembly 84 positioned at the end of fourth chamber 159 adjacent first chamber 95 has a flow blocking element 86 and a biasing element 88, such as a spring. Biasing element 88 biases flow blocking element 86 against valve seat 92 formed on piston mount 78 so that the valve does not permit compression flows but does permit rebound flows when the force exerted by the fluid against the flow blocking element 86 is sufficient to overcome the force exerted by biasing element 88. The force required to displace the flow blocking element 86 of the check valve assembly 84 may be adjusted, for example, by inserting a spring having a different spring rate.

As will be clear to those skilled in the art, the fluid pressure required in fourth chamber 159 to move floating piston 18 toward the second end 42 of inner cylindrical body 14 will generally be greater than that required to overcome the force of biasing element 88 against flow blocking element 86 of check valve assembly 84. Accordingly, the fluid flowing into fourth chamber 159 during rebound will open check valve assembly 84 and pass out of fourth chamber 159 and into first chamber 95 more readily 10m than moving floating piston 18.

As will be understood by those skilled in the art, several advantages are achieved by the present invention. In addition to the reductions in weight and manufacturing costs previously described, the shock absorber of is the pre sent invention provides for a high degree of adjustability to user needs and preferences. For example, the use of an air assist to the outer coil spring 22, such as provided by gas-filled fifth chamber 161 enables adjustment of the spring rate of shock absorber 10 not only by using the adjustable spring seating ring 24, but also by varying the air pressure within fifth chamber via valve 162.

In addition, the shock absorber of the present invention is capable of a high degree of damping adjustment. In particular, independent low-speed compressive and rebound damping valves and independent high-speed compressive and rebound damping valves permit independent adjustment of the high and low-speed compressive and rebound damping characteristics of the shock absorber. Furthermore, the low-speed compressive and rebound damping valves are externally adjustable, thereby facilitating adjustment by a user.

The twin tube design of the shock absorber of the present invention also serves to increase the lateral stiffness of the shock absorber. When this shock absorber is used in connection with a bicycle, for example, the result is an overall increase in the stiffness of the bicycle frame.

It will be appreciated that, although this suspension system may be utilized in a wide variety of devices, machines, and vehicles, an exemplary use of the present invention is in the rear suspension system of a bicycle.

While the foregoing description and drawings represent the preferred embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims, and not limited to the foregoing description.

What is claimed is:

1. A shock absorber for use in a suspension system, said shock absorber damping said suspension system by controlling damping fluid flow in said shock absorber during compression and rebound of said suspension system, said shock absorber comprising:

an outer cylindrical body having a first end and a second end;

an inner cylindrical body having a first end and a second end, said inner cylindrical body being slidable within said outer cylindrical body;

a piston assembly coupled to said first end of said inner cylindrical body; and a glide tube positioned within said outer cylindrical body, said inner cylindrical body sliding within said glide tube in said outer cylindrical body such that said piston assembly slides within said glide tube;

wherein:

a first chamber is defined within said glide tube;

a substantially annular second chamber is defined between said outer cylindrical body and said glide tube;

a third chamber is defined within said glide tube;

a first valve assembly is formed in said piston assembly;

said first valve assembly controlling flow between said first chamber and said third chamber, with the flow control through said first valve assembly being adjustable such that compression damping and rebound damping are separately controllable;

said piston assembly comprising a first piston and a second piston mounted on said inner cylindrical body, said first piston being adjacent said first chamber and said second piston being positioned between said first piston and said inner cylindrical body;

a fourth chamber defined between said first and second pistons;

said third chamber being in fluid communication with said fourth chamber; and said first valve assembly further comprising a first valve controlling only compression damping fluid flow between said first and fourth chambers to thereby control compression fluid flow between said first and third chambers.

2. A shock absorber as in claim 1, wherein said first valve assembly further comprises a second valve controlling only rebound damping fluid flow between said first and third chambers.

3. A shock absorber as in claim 2, wherein:

said shock absorber further comprises a piston mount having a first end and a second end;

said piston assembly is coupled to said first end of said piston mount and said second end of said piston mount is coupled to said inner cylindrical body such that said piston mount couples said piston assembly to said inner cylindrical body;

said piston mount has a hollow interior forming part of said third chamber; and said second valve is positioned on said first end of said piston mount.

4. A shock absorber as in claim 2, wherein:

a sixth chamber is defined between said second piston, said inner cylindrical body, and said glide tube;

said second chamber and said sixth chamber are in fluid communication; and said first valve assembly further comprises a third valve in said second piston, said third valve separately controlling compression and rebound damping fluid flow between said fourth chamber and said sixth chamber such that compression damping is adjustable independently from rebound damping.

5. A shock absorber as in claim 4, further comprising a floating piston positioned within said inner cylindrical body, wherein a fifth chamber is defined between said second end of said inner cylindrical body and said floating piston.

6. A shock absorber as in claim 5, further comprising:

a mounting portion coupling said first ends of said outer cylindrical body and said glide tube; and a second valve assembly positioned within said mounting portion and between said first and second chambers;

wherein said second valve assembly separately regulates compression and rebound damping fluid flow between said first and second chambers such that compression damping and rebound damping are separately controllable.

7. A shock absorber as in claim 6, wherein:

said second valve assembly comprises a one-way compression valve controlling compression flow and a one-way rebound valve controlling rebound flow; and said one-way compression valve and said one-way rebound valve are separately controllable.

8. A shock absorber as in claim 5, wherein said fifth chamber is pressurized to counteract pressure against said floating piston from damping fluid entering said fourth chamber during compression of said suspension system.

9. A shock absorber as in claim 8, further comprising a pressure valve in fluid communication with said second end of said inner cylindrical body, said pressure valve permitting adjustment of said pressure within said fifth chamber.

10. A shock absorber as in claim 1, further comprising a biasing element maintaining said inner cylindrical body and said outer cylindrical body in a neutral spaced-apart configuration.

11. A shock absorber as in claim 1, wherein said glide tube is formed of stainless steel.

* * * * *